(12) United States Patent
Kamaraju et al.

(10) Patent No.: US 12,154,289 B2
(45) Date of Patent: Nov. 26, 2024

(54) CONTEXT AWARE MEASUREMENT

(71) Applicant: STREEM, LLC, Portland, OR (US)

(72) Inventors: Pavan K. Kamaraju, London (GB);
Nicholas Degroot, Portland, OR (US)

(73) Assignee: STREEM, LLC, Portland, OR (US)

( * ) Notice: Subject to any disclaimer, the term of this patent is extended or adjusted under 35 U.S.C. 154(b) by 354 days.

(21) Appl. No.: 17/520,210

(22) Filed: Nov. 5, 2021

(65) Prior Publication Data
US 2023/0141372 A1 May 11, 2023

(51) Int. Cl.
*G06T 7/60* (2017.01)
*G06F 18/21* (2023.01)
*G06T 5/80* (2024.01)
*G06T 17/00* (2006.01)
*G06V 10/22* (2022.01)
*G06V 20/20* (2022.01)

(52) U.S. Cl.
CPC .............. *G06T 7/60* (2013.01); *G06F 18/21* (2023.01); *G06T 5/80* (2024.01); *G06T 17/00* (2013.01); *G06V 10/22* (2022.01); *G06V 20/20* (2022.01); *G06T 2207/20092* (2013.01)

(58) Field of Classification Search
CPC .. G06T 7/60; G06T 5/80; G06T 17/00; G06T 2207/20092; G06T 2207/10016; G06T 2207/20101; G06F 18/21; G06F 3/04842; G06F 3/04845; G06V 10/22; G06V 20/20; G01B 11/022
See application file for complete search history.

(56) References Cited

U.S. PATENT DOCUMENTS

| | | | |
|---|---|---|---|
| 2015/0248719 A1* | 9/2015 | Hansen | G06Q 30/0627 705/26.63 |
| 2018/0300915 A1* | 10/2018 | Heggelund | G06T 7/11 |
| 2020/0357132 A1* | 11/2020 | Jovanovic | G06T 7/80 |
| 2022/0012522 A1* | 1/2022 | Andreotti | G06T 3/608 |

* cited by examiner

*Primary Examiner* — Jianxun Yang
(74) *Attorney, Agent, or Firm* — Schwabe Williamson & Wyatt

(57) ABSTRACT

Embodiments include systems and methods for remotely measuring distances in an environment captured by a device. A device captures a video stream of a device along with AR data that may include camera pose information and/or depth information, and transmits the video stream and AR data to a remote device. The environment may be analyzed to identify objects such as lines, edges, curves, shapes, anchors/corners, products, e.g., appliances, and other things of interest. Some or all of objects may be identified to the remote device to facilitate selecting an object or region of interest. Selected points for an object may be more precisely located by snapping them to corresponding anchor points for an object. Using anchor points facilitates more precise identification and/or measurement of an aspect of an object, such as one of its dimensions, the volume of a space, or performing other actions such as replacement of an object.

20 Claims, 8 Drawing Sheets

CONTEXT AWARE MEASUREMENT

TECHNICAL FIELD

The present disclosure relates to the field of augmented reality (AR), and specifically to processing of a video stream and AR data by a remote device to enable measurement of elements or objects in an environment shown by the video stream.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. These detected features, combined in some implementations with data from depth sensors, measurement sensors (e.g., LIDAR), computer vision, and/or motion information captured from motion sensors such as a MEMS gyroscope and accelerometers, can facilitate AR software in creating a model, e.g., a point cloud, mesh, polygonal model, or other model of a three-dimensional space that may be mapped onto or otherwise correspond to an environment such as a room, location, an object, or other space. The model enables AR-based applications to analyze and interact with objects within the model, as well as to generate and place virtual objects within the model. The model may be based on pictures and/or video captured by a smartphone or other mobile device, camera(s) and/or other device(s) of a mobile device or other devices in the environment. Characteristics and/or status or other data generated by and/or associated with sensors, measurement devices, etc. used to help generate the model may be stored in or otherwise associated with the model.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
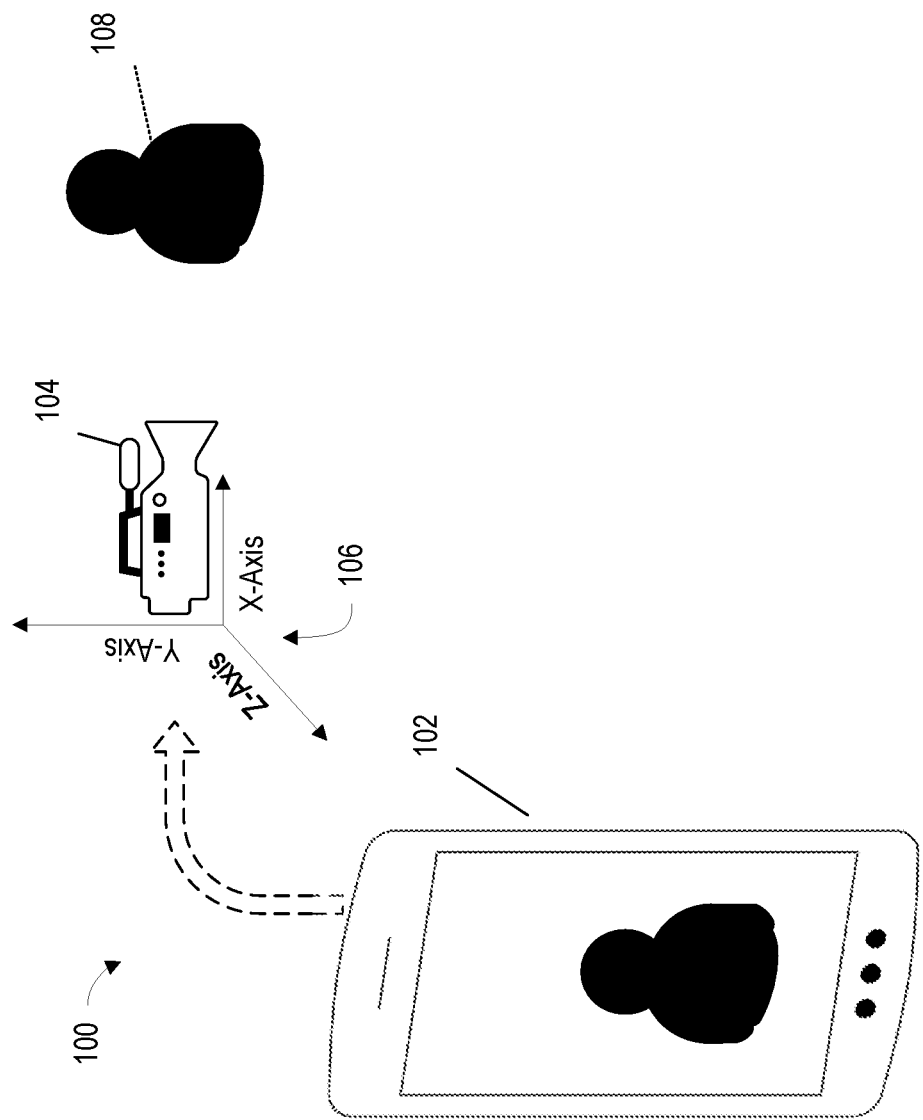
FIG. 1 illustrates a block diagram of the components of a system for capturing a video stream and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent. The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element. The description may use the terms "embodiment" or "embodiments," which may each refer to one or more of the same or different embodiments. Furthermore, the terms "comprising," "including," "having," and the like, as used with respect to embodiments, are synonymous.

A device that supports augmented reality ("AR") typically provides an AR session on a device-local basis (e.g., not requiring communication with a remote system), such as allowing a user of the device to capture a video using a camera built into the device, and superimpose AR objects upon the video as it is captured. Support for superimposing AR objects is typically provided by the device's operating system, with the operating system providing an AR application programming interface (API). Examples of AR APIs include Apple's ARKit, provided by iOS, Google's ARCore, provided by Android, as well as others such as PTC Inc.'s Vuforia Engine, Unity Technology's Unity, the Blender Foundation's Blender, Amazon's Sumerian, etc. The APIs typically use both the stream of frames captured by the device camera as well as other available motion data, such as a gyroscope and/or accelerometers contained within the device, to compute a point cloud. The available motion data allows the camera pose, the position of the camera in space relative to its surrounding environment, to be determined as the device moves. Knowing the camera pose helps establish an accurate point cloud when using a handheld or similar mobile device that may move while simultaneously capturing the surrounding environment.

The point cloud typically includes one or more points that are indicated by an x, y position within the device's environment, such as coordinates on a screen attached to the device while the one or more points are visible to the camera. A depth (or z-axis) point may also be measured directly (if the device is so equipped) or computed for each of the one or more points. The x, y, and z positions of each point in the point cloud may be tied to or expressed with respect to an identified anchor feature within the frame, e.g. a corner or edge of an object in-frame, which can be readily identified and tracked for movement between frames, or to some other fixed reference point. The associated x, y, and z values in combination with camera pose data further allow each point in the point cloud to be identified in space relative to the device. As will be appreciated, x, y, and z values calculated with respect to a moving device will continuously change for each detected/calculated point as the camera of the capturing device moves in space relative to the anchor features. In some implementations, each point in the point cloud may include additional data, such as a confidence value indicating the API's estimate of the accuracy of the computed depth value, location of the anchor point, and/or possibly other extrapolated values.

While some embodiments contemplate using a point cloud, other embodiments may use a polygonal model, or mesh model, instead of or in addition to a point cloud model. For discussion purposes below, use of a point cloud may be assumed, but one skilled in the art will appreciate the discussion below may be applied to a polygonal model. A calculated point cloud allows AR objects to be placed within a scene and appear to be part of the scene, viz. the AR object moves through the camera's view similar to other physical objects within the scene as the camera moves. Further, by employing object detection techniques along with motion data, in some implementations the API can maintain track of points that move out of the camera's field of view. This allows a placed AR object to disappear off-screen as the camera moves past its placed location, and reappear when the camera moves back to the scene location where the AR object was originally placed.

As may be understood from the foregoing description, the point cloud represents location data about the physical world relative to and surrounding the capturing device. The various points in the point cloud may thus (in most implementations) be expressed as values relative from the capturing device. When the capturing device moves, e.g. is panned or tilted, in a sense, these values change, e.g. can be recomputed using sensed motion data about the movements of the capturing device, as though the world were moving about the capturing device's position, with the capturing device serving as a fixed reference point. The motion data captured by the capturing device, then, effectively expresses how the world moves about the capturing device. As the capturing device moves, an increasing amount of the world passes through the field of view of the capturing device. When combined with continued tracking/storage of detected points that move outside the camera's field of view, the point cloud representing the world detected and viewed through the capturing device's camera that is initially generated can be progressively increased and expanded.

The captured point cloud can be used to identify the location of one or more of the points in the point cloud relative to each other. For fixed or stationary objects that are mapped within the point cloud, the spatial relationship of two points within the point cloud tied to stationary objects are expected to remain consistent, even while the position of the device and its camera may be in a relative state of flux as the camera changes orientation and position with device movements. These stable positions may be subject only to refinement in position as the device is able to capture additional data around a given point when the point is within view of the device. Furthermore, the spatial relationship of points within the point cloud can persist between points that are not normally simultaneously in frame, viz. the device camera must be panned or moved away from one point to view another. The use of camera movement data/camera pose can help establish the spatial relationship between two points within the point that are captured at different locations by the device camera.

With the spatial position of various points within the point cloud determined, measurements can be made between arbitrary fixed points within the point cloud. Thus, in disclosed embodiments, measurements can be taken both of objects fully within the frame of the device camera, as well as objects where the device must be panned or moved to fully capture, e.g. a long or tall object in a room where the device camera cannot be positioned to capture the entirety of the object. Still further, disclosed embodiments are not limited to linear measurements. By including reference to three, four, or more points, arbitrary areas can be computed from at least three point cloud points that define a plane, as well as volumes for arbitrary 3D regions that can be defined by reference to at least four point cloud points.

Most devices capable of capturing point cloud data are further capable of network communications with a remote device or server. The device may transmit the point cloud data over the network to the remote device or server, allowing the remote device or server to compute distances, areas, and/or volumes from the point cloud data by internal reference between points within the point cloud. Still further, by also transmitting camera pose data as a continually changing data stream, a user of a remote device or server could instruct a user of the device to position the device camera at desired locations to capture additional point cloud data that may have not been previously captured. This additional data may then be used to take measurements of an object that was only partially viewable. The ability to provide guidance over a remote communications session, and to direct a user of the device to capture data for measurements of portions of objects, can enable a user of the remote device or server to provide service or assistance to a user of the device. Other possible embodiments will be described herein as appropriate.

It will be appreciated 3D models may be developed at least in part by creating a polygonal mesh (a 3D mesh) for an environment, such as a room, office, building, object(s), etc. The model may be defined with respect to 3D data captured within the environment, and/or based on one or more 2D photo of the environment, and/or based on one or more point clouds corresponding to the environment. Point clouds may be used to generate a 3D mesh for a model for the environment, or to regenerate and/or expand and/or enhance an existing 3D mesh. In some embodiments, one or more different 3D meshes may be generated from combining point clouds, and one may elect elements from the point clouds to retain in the combined 3D mesh.

FIG. 1 illustrates an example system 100 that may enable capture of an image or video that includes AR data. System 100 may include a mobile device 102. In the depicted embodiment of FIG. 1, mobile device 102 is a smartphone, which may be implemented as a computer device 700, to be discussed in greater detail below. Other embodiments may implement mobile device 102 as a variety of different possible devices, such as a computer (desktop or laptop), tablet, two-in-one, hybrid, smart glasses, or any other computing device that can accept a camera and provide necessary positional information, as will be discussed in greater detail herein. Mobile device 102 further may include a camera 104 and one or more spatial position sensors 106 (depicted by a series of axes), which provides information about the spatial position of camera 104, also known as the camera pose. It will be understood that camera 104 and spatial position sensors 106 may be contained within the body of mobile device 102. Camera 104 is used to capture the surrounding environment of mobile device 102, and by extension, the user. The environment may include one or more three-dimensional objects 108.

It should be appreciated that while mobile device 102 is depicted as a smartphone, mobile device 102 could be any device that includes a camera 104 and associated spatial position sensors 106 that can be moved about an environment. For example, in some embodiments mobile device 102 could be a laptop or tablet. In other embodiments, mobile device 102 could be a sensor package that includes camera 104 and spatial position sensors 106 which is in communication with a separate processing unit, such as a desktop computer or server. The sensor package may communicate with the separate processing unit via a wireless or wired link.

Camera 104 may be any camera that can provide a suitable video stream for the intended purpose of device 102. Where mobile device 102 is implemented as a smartphone or tablet, camera 104 may be one or more built-in cameras. In other embodiments, such as where mobile device 102 is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and mobile device 102. In other embodiments, such as where mobile device 102 is equipped with multiple cameras and/or similar sensors, one or more of the sensors may be configured to directly detect depth points, such as a 3D camera, stereoscopic camera, LIDAR, or other suitable depth-sensing technology.

Spatial position sensor 106 may be configured to provide positional information about the pose of camera 104, such as camera 104's pan and tilt. Other measured positional vectors may include camera movements, such as the camera rising or falling, or moving laterally, which allows the camera pose to be tracked and updated as mobile device 102 is moved through space in the environment relative to any static objects. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

Figure 2:
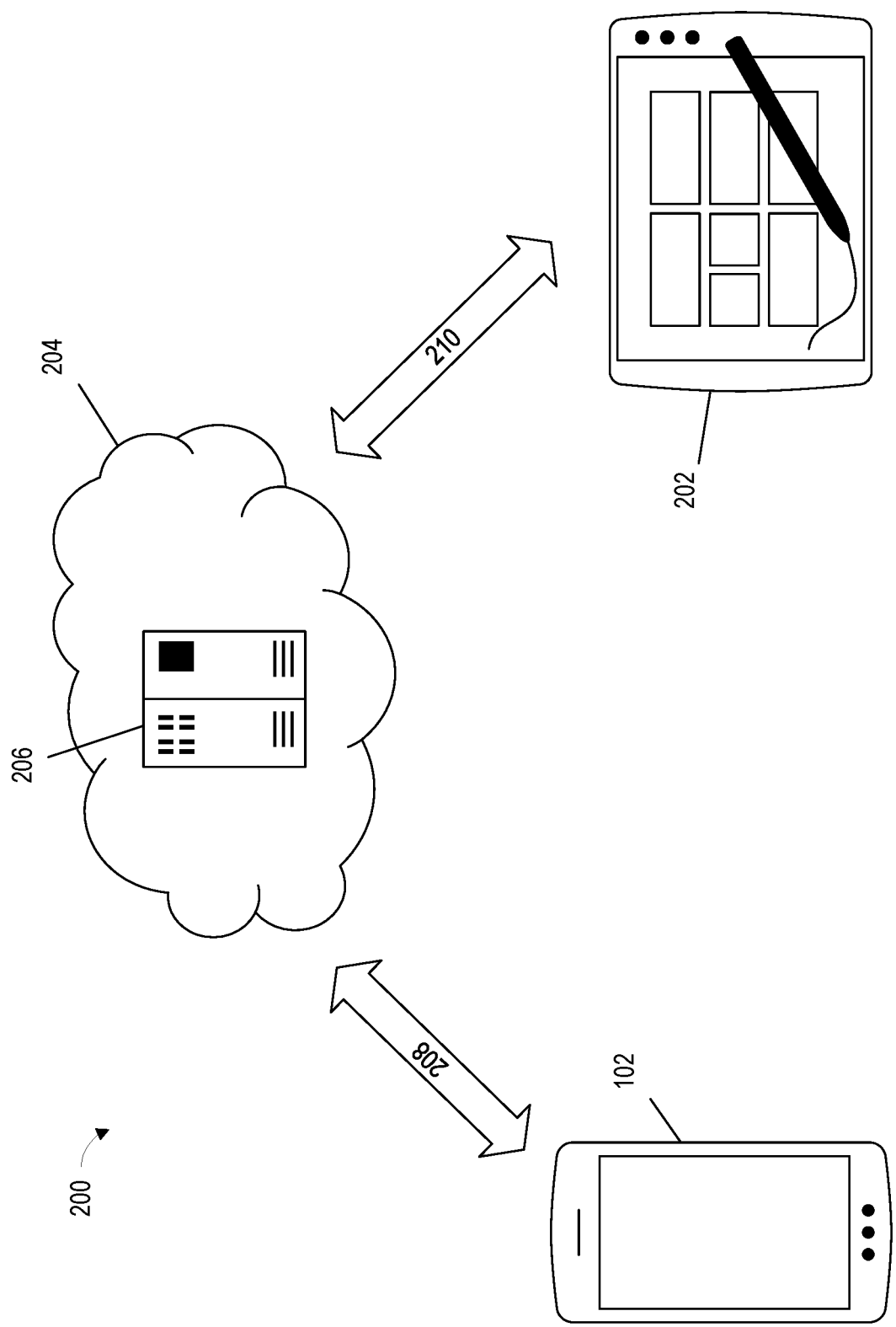
FIG. 2 illustrates a block diagram of the system components of one possible embodiment of an augmented reality system operable over a network, according to various embodiments.

FIG. 2 illustrates an example system 200 that embodies an augmented reality (AR) platform for interacting with a remotely provided video stream using AR objects. System 200 may include a mobile device 102 and a remote device 202, which in turn may be linked via a network 204. In embodiments, system 200 may receive a data stream from mobile device 102 that includes a video stream along with associated AR data, as described above with respect to FIG. 1. The data stream from mobile device 102 may then be transmitted to a remote device 202, where a user of the remote device 202 can interact with the data stream, including inserting AR objects or performing AR-based tasks, such as distance and area measurements, on the data stream that are reflected back to the mobile device 102.

Figure 7:
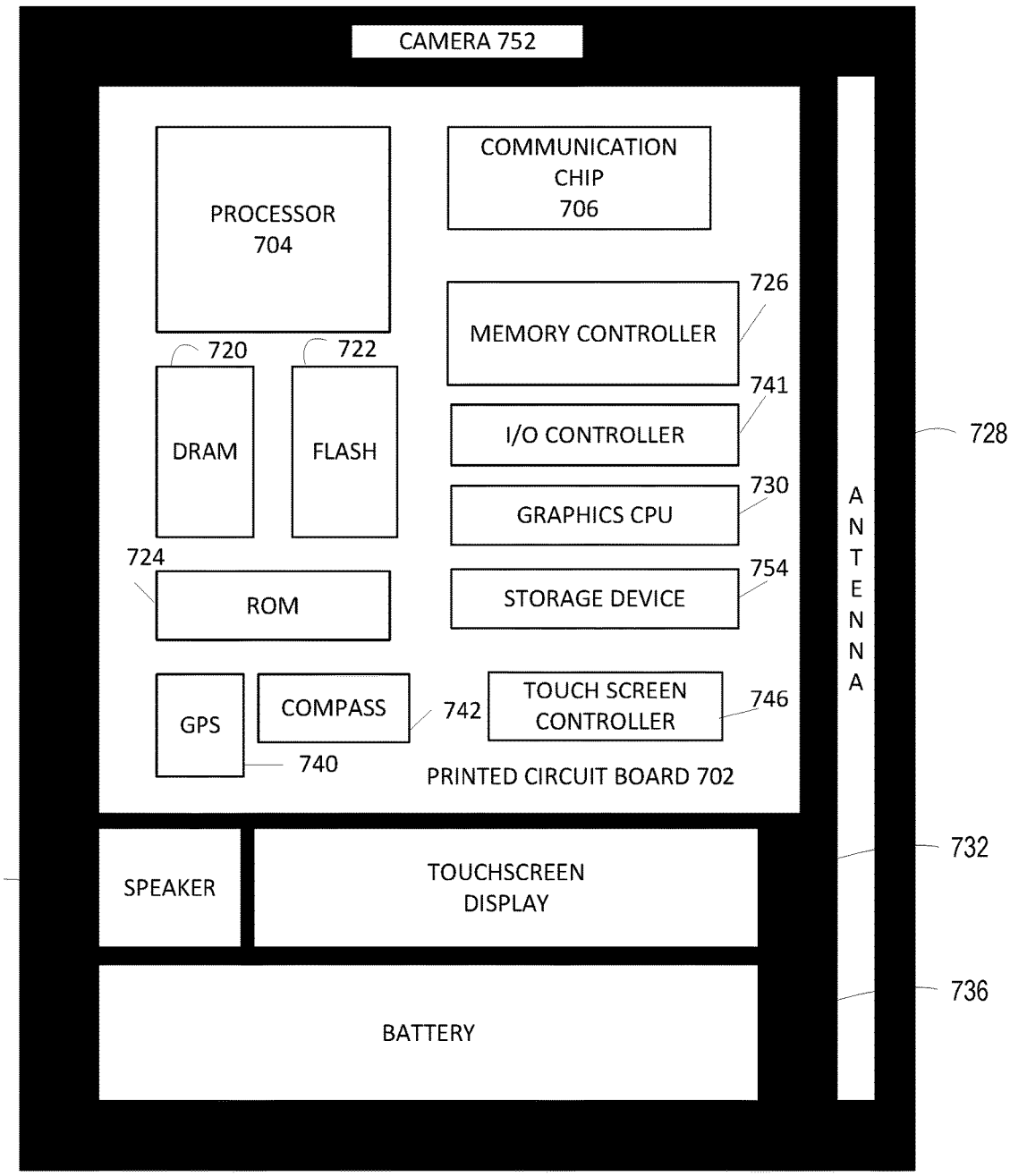
FIG. 7 is a block diagram of an example computer that can be used to implement some or all of the components of the system of FIG. 1, according to various embodiments.

Mobile device 102, described above with respect to FIG. 1, and remote device 202 may be a computer system such as the computer device 700 depicted in FIG. 7, and in some embodiments may be a mobile device such as a smartphone, tablet, or other similar device that has an integrated processor, screen, video camera, and network communications interface. In other embodiments, mobile device 102 may be a computer system with discrete components, e.g. the system box or CPU is distinct from I/O peripherals. Mobile device 102 and remote device 202 may be, but do not need to be, identical. For example, a service provider may prefer to use a dedicated computer terminal (e.g. a desktop or laptop computer) to interact with a mobile device 102. Likewise, a consumer may prefer to use a tablet or laptop as alternatives to a smartphone for mobile device 102.

Mobile device 102, in embodiments, is capable of transmitting video captured by camera 104 to remote device 202 over a network 204, as well as receiving data over network 204 that is supplied by a user of remote device 202. Remote device 204, similarly, is capable of receiving data such as video over network 204 from mobile device 102, and allowing a user of remote device 202 to place one or more AR objects into or otherwise interact with the received video. Remote device 202 can then transmit information about the placed AR object(s) over network 204 back to mobile device 102, whereupon mobile device 102 updates a display attached to or otherwise associated with (e.g., external wired and/or wireless displays and/or other output technology) mobile device 102 to depict and/or output the captured photos and/or video with the placed AR object(s).

Mobile device 102 may run a dedicated app to provide functionality for system 200. Other embodiments may allow functionality to be handled via a web site or web application (e.g. a software as a service, "SaaS", approach). Still other embodiments may use dedicated hardware, or a combination of software and hardware, to provide functionality for system 200 to the user. Likewise, remote device 202 may run a dedicated app to provide functionality for system 200, or use a web site, web application, dedicated hardware, or a combination of the foregoing. Some embodiments may use the same app or other method of delivering necessary functionality on both mobile device 102 and remote device 202, with functionality appropriate to the user enabled based upon a user-supplied credential or other indication of the user's role. For example, such an app may provide for capture and transmission of video when configured in a consumer role, and enable placement of one or more AR objects when configured for a service provider or assistant role. Other embodiments may provide separate apps (or other methods) for a user of mobile device 102 and remote device 202. In some embodiments, a central server 206, discussed below, may provide some or essentially all functionality for system 200, with any application or website on mobile device 102 and/or remote device 202 acting essentially as a front end for displaying and interacting with content provided by central server 206.

In embodiments and as mentioned above, system 200 provides the ability for a user of either mobile device 102 or remote device 202 to superimpose one or more AR objects to assist in the remote delivery of services or to facilitate a video communications session between mobile device 102 and remote device 202. Central server 206 may coordinate and synchronize, or assist in the coordination and synchronization, of such AR objects between mobile device 102 and remote device 202. The functionality of synchronizing AR objects may be supplied by central server 206, mobile device 102, remote device 202, a combination of two or more of the foregoing, and/or via another provider or source external to system 200, depending upon the specifics of a given implementation. Although previous embodiments described placement of AR objects by the user of remote device 202, in other embodiments mobile device 102 may also allow placement and interaction with AR objects, which may further be transmitted and reflected on remote device 202.

Network 204 may be a network capable of supporting the exchange of a video feed between mobile device 102 and remote device 202 as well as augmented reality instructions. In some embodiments, network 204 may comprise the Internet, a local area network, wide area network, metropolitan area network, or a combination of the foregoing, or another suitable type or types of network communication. As can be seen, mobile device 102 may connect to network 204 via a communications link 208, and remote device 202 may connect to network 204 via a communications link 210. Each of communications links 208 and 210 may be any one or more of the foregoing network types. The various devices that comprise network 204 are well known to practitioners skilled in the relevant art, and will not be discussed further herein.

In some embodiments, network 204 comprises a server, collections or clusters of servers, one or more data centers, or other suitable means for data processing. For example, network 204 may be implemented as a cloud service, with mobile device 102 and remote device 202 each connecting to the cloud service. The cloud service may be operated by a provider of services for system 200. In the depicted example, network 204 includes a central server 206, which may be controlled by the provider of some or all of system 200. Central server 206 may comprise one or more computer devices 700, such as is known for data centers and cloud services. Further, depending on the specific needs of a given implementation, central server 206 may be implemented in a distributed fashion, with multiple nodes potentially located in geographically diverse areas.

Central server 206 may be configured to handle some or all of the functionality of system 200 described above. For example, central server 206 may handle processing of a video stream from mobile device 102, and/or processing insertions of AR objects from remote device 202. Central server 206 may further coordinate the synchronization of one or more AR objects placed by remote device 202 to mobile device 102, for presentation on a screen associated with mobile device 102. In some embodiments, central server 206 may handle any image analysis, including object recognition or AI processing, which may be used to help compute the point cloud and/or any associated anchor points or features. In other embodiments, central server 206 may receive the results of any image analysis, and supply the results to mobile device 102. In yet other embodiments, central server 206 may receive video from mobile device 102 as described above, and handle processing.

Some combination of any of the foregoing embodiments may also be possible, with a different approach taken depending upon the nature and capabilities of a given mobile device 102. For example, where mobile device 102 is a smartphone running a dedicated app, mobile device 102 may be able to perform some or all object recognition on a captured video. In contrast, where mobile device 102 is a web browser, and the web browser is not capable of processing, for example, captured video at a minimum desired quality and/or functional ability, the mobile device 102 may simply pass some or all of video to central server 206 for processing and recommendations.

Mobile device 102 and remote device 202, in the disclosed embodiments, are capable of establishing a two-way communications link, thereby allowing a user of mobile device 102 to directly connect to remote device 202 without need of leaving system 200. In some embodiments, system 200, such as via central server 206, coordinates communications, acting as a relay or communications provider. In such embodiments, central server 206 may also coordinate exchange of AR objects between mobile device 102 and remote device 202. In other embodiments, mobile device 102 and remote device 202 directly link over network 204 without going through a central server 206. In such an embodiment, any AR objects inserted into the video stream are communicated directly from one device to the other. In some such embodiments, either mobile device 102, remote device 202, or aspects of both, may provide the functionality and serve in the capacity of central server 206.

It should be understood by a person skilled in the relevant art that the labeling of mobile device 102 and remote device 202 are only for the sake of example to denote a likely relationship between the users of each device. There may be no practical difference (if any difference at all) between the functionality and capabilities of mobile device 102 and remote device 202.

Figure 3:
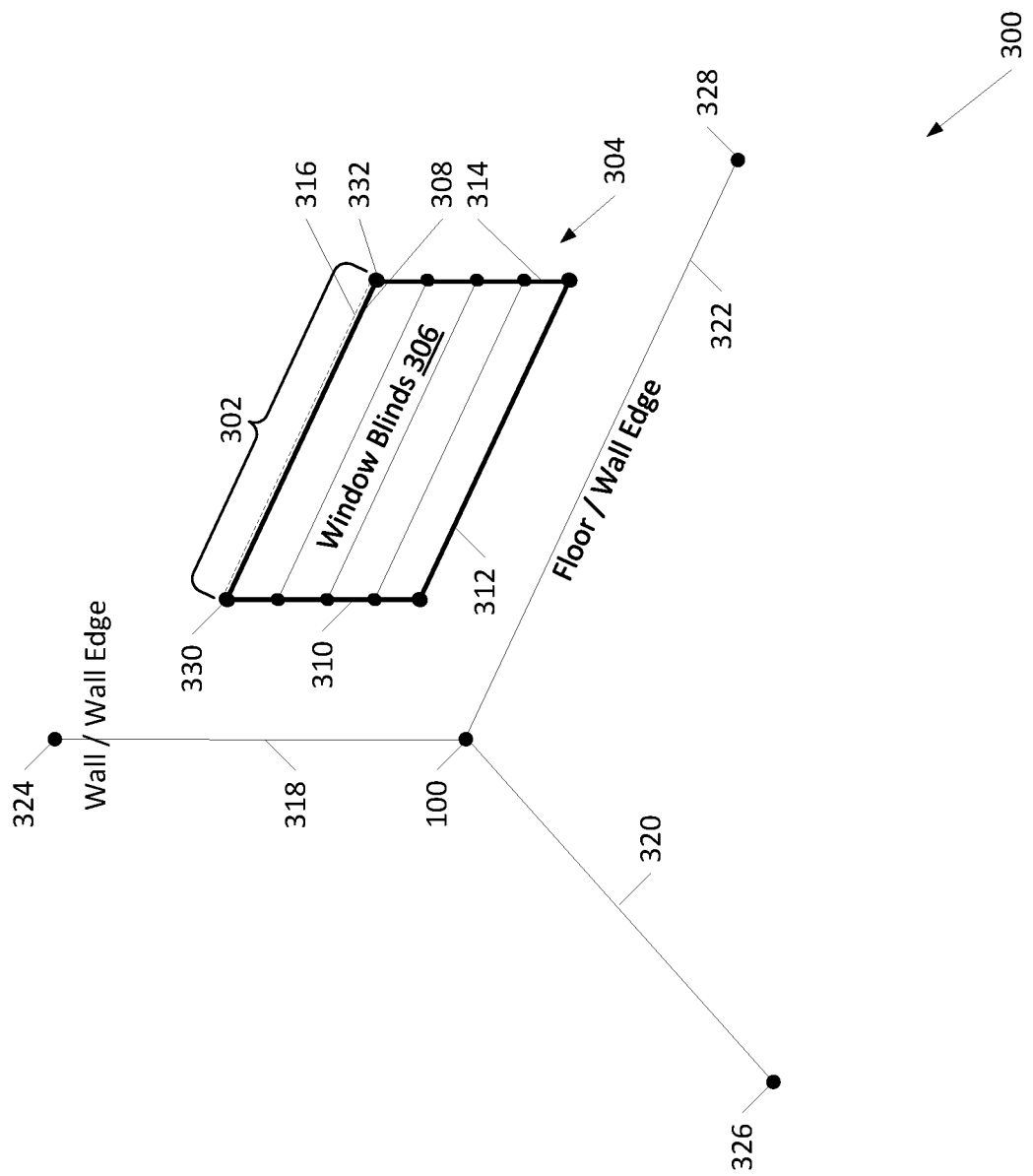
FIG. 3 depicts an environment in which a device may be used to measure a portion of an object (or region of interest) in the environment.

FIG. 3 depicts an environment 300 in which a device, such as FIG. 1 mobile device 102, may be used to measure a portion 302 of an object 304 (or region of interest) in the environment. In the illustrated embodiment, the environment may be, for example, a room, and the object may be, for example, a window with window blinds 306 and edges 308-314 and the portion 302 to measure is the top edge 308 of the window. One or more device, such the mobile device 102, may individually and/or cooperatively with other devices, be used to obtain data including picture, video, sensor, and/or other data, including data retrieved from a data store such as a database that may be stored, for example, in the FIG. 7 storage device and/or accessible over a network/Internet. Sensed and/or retrieved data may be used to derive and/or otherwise compute a model corresponding to the environment. The model may encode 3D positional data for points defined in the model that correspond to real-world locations within the environment.

In the illustrated embodiment, the portion 302 to be measured is highlighted with a dashed line 316. The dotted line is presented in the illustration for explanation purposes and is not actually part of the environment 300. Instead the dotted line represents output from applying one or more edge detection and/or curve and/or feature extraction algorithm against the image(s) and/or video(s) of the environment. Exemplary well-known algorithms include edge detection such as Canny, Sobel, Gaussian, Laplacian, Prewitt, etc.; edge filters, line and/or object detection and/or transform, such as Hough transform, etc.; or corner detection such as Harris, Harris and Stephens, Förstner, etc. It will be appreciated by one skilled in the art there are many different line detection, feature extraction, edge detection, corner detection, and the like algorithms that maybe applied to a representation (images, videos, models, etc.) of the environment to identify edges, lines, corners, shapes and/or features of interest. The dotted line represents one of many edges 316 (or lines) that may be detected in the environment from applying one or more of the above exemplary algorithms.

Thus, for example, in addition to identifying the edge 316, feature extraction algorithms may recognize other lines or features in the environment 300 such as floor and wall lines 318-322, window edges 308-314, dividers for the window blinds 306, etc. Note for illustration clarity, each divider line is not labeled. In addition, corner detection would typically identify "corners", or anchor points, identifying breaks in detected lines or edges. Exemplary called out anchor points are points indicating identified extents 324-328 of the wall edges, the end point anchors 330, 332 of the top edge 308 of the window to be measured. These are referred to as exemplary since it will be appreciated this illustrated embodiment is a simplified representation of applying detection algorithms to the environment, and hence, for example, corner detection algorithms would typically detect more anchor points than illustrated. Also, for illustration clarity, other illustrated exemplary anchors, lines, edges, etc., such as anchors for the ends of the windows blinds 306 dividers or the window, are not labeled.

Detection of lines, such as the line 316 to be measured, facilitates measuring objects in the environment 300, such as during a remote support call where a remote support agent or remote user is trying to assist, for example, a homeowner to perform an operation or action with respect to something in the environment. For example, a remote agent may assist a homeowner to repair the window 304, replace the blinds 306, order a new part that requires knowing the size of the portion 302, or to take any other action or engage in any activity that needs to have an accurate measurement within of this or other object(s) in the environment. If we assume a support call from a remote agent to a local user, e.g., the homeowner or other entity, the remote agent may ask the homeowner to use a device, such as the FIG. 1 mobile device 102, to measure the portion 302 or region of interest. In one embodiment, various data may be determined through sensing performed by the mobile device, and/or in combination with data from other sensors or existing recordings/data stored in a database, including a 3D model determined for the environment. As discussed above, we may have acquired point cloud data, polygonal, and/or other data to generate a model for the environment that may include 3D coordinates corresponding to the environment. Application of one or more edge detection and/or curve and/or feature extraction algorithm against image(s) and/or video(s) of the environment may allow detecting lines, edges, curves, objects, anchor points, etc. in the environment that may be mapped against and/or otherwise associated with coordinates in a model of the environment.

In a support call a remote agent could ask that the homeowner to draw on their device, such as mobile device 102, to identify the object to be addressed and begin to measure it, e.g., to determine with width of the window 304 by examining the identified edge 316 corresponding to the window top edge 308. It will be appreciated drawing on a device to identify the window edge to measure may be imprecise, especially if the user interface is detailed/crowded and/or if drawing is performed with an imprecise tool, such as a finger. With a model, e.g., a 3D model, for the environment 300, and applying detection algorithms to identify, for example, as output from the detecting the corresponding dashed line 316 for the top edge 308, and anchor points 330, 332, when the homeowner is attempting to draw across the top of the window to select it for measurement, the selection may be automatically snapped to the starting anchor 330, and movement of the selection tool (e.g., a finger, stylus, or other item or device) may be snapped or otherwise made to traverse the identified dashed line. Assuming selection stops proximate to the other anchor point 332 the end of the selection may be snapped to that anchor point.

In one embodiment, the coordinate locations of the selected anchor points 330, 332 (and, if and as needed, other identified items such as edges, lines, objects, etc. in the environment), may be determined by projection into the model for the environment based at least in part on the known location for the edges in the environment that were detected. With identified coordinate locations within the model for the anchor points 330, 332 and dashed line 316, the remote agent may get an accurate selection of the top edge of the window, and also determine an accurate measurement of the top edge 308.

Figure 4:
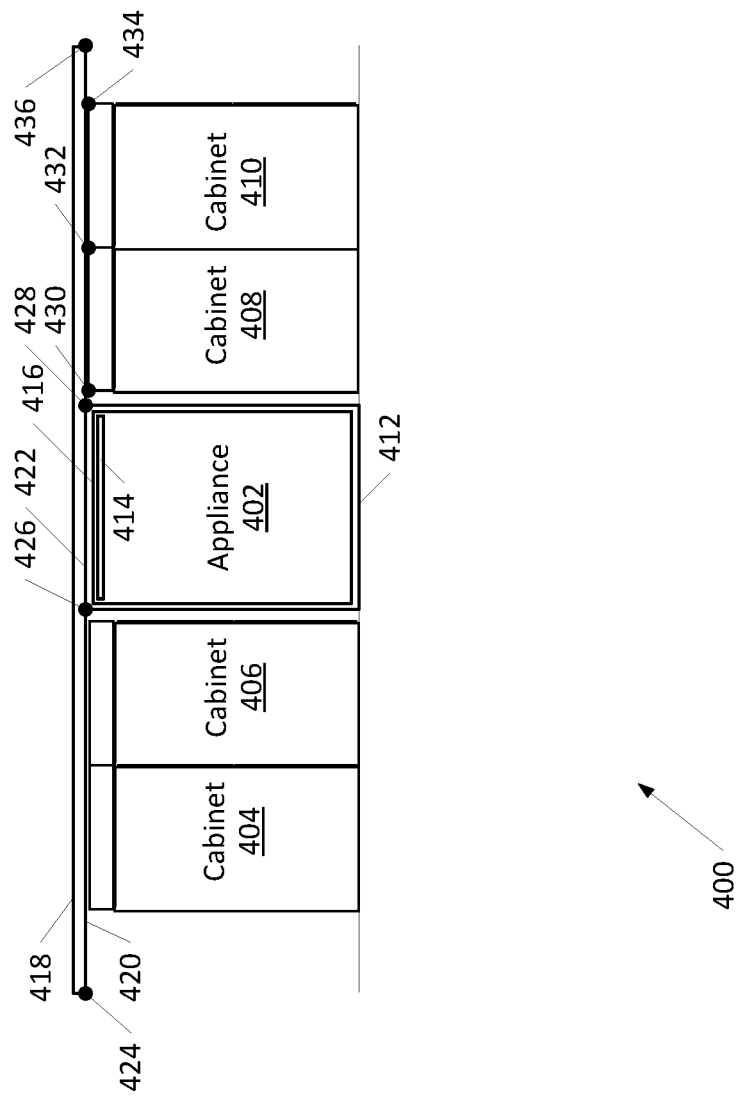
FIG. 4 illustrates an environment in which an appliance is installed adjacent to cabinets.

FIG. 4 illustrates an environment 400 in which an appliance 402 is installed adjacent to cabinets 404-410. As discussed with respect to FIG. 3, assume there is a model corresponding to the environment that includes 3D coordinates for the environment, In the illustrated embodiment it is assumed detection and/or segmentation algorithms have been applied to one or more image and/or video of the environment to identify, as desired, edges, lines, objects, features, anchor points (e.g., corners), and the like. It will be appreciated an Artificial Intelligence (AI) may be employed to determine context and/or to identify specific objects, types of objects, object model numbers/types, etc. within the environment to facilitate interacting with the environment. One such interaction includes a remote user, such as a support agent, performing remote support for a caller, e.g., a homeowner, in the environment. It will be appreciated there are many different AI Engines that may be employed, such as neural networks (feedforward, recurrent, backpropagation, deep learning, etc.), expert systems, and many other analytical systems. It will be appreciated an AI Engine may be incorporated into the computer system 700. However, a robust AI Engine may require resources unavailable to certain computers, and a remote AI Engine may be accessible over a local network(s) (LAN) and/or over another network such as a Wide Area Network (WAN), and/or Internet, or other network(s). It will be appreciated one or more AI Engine may cooperatively operate, with a remote support agent and/or amongst themselves, to analyze problems and suggest answers.

Let us assume the homeowner seeks support for the appliance 402, and the remote agent determines the appliance is broken and requires replacement. Before replacing the remote agent needs to know the size of the opening 412 that is housing the appliance. It will be appreciated this task, while simple to articulate, is more difficult when it is clear there are many possible edges that have been detected, including edges for a handle 414 of the appliance, the top edge 416 of the appliance, the top 418 and bottom 420 of a countertop under which the appliance and cabinets 404-410 are installed, etc. It may be difficult to distinguish between different edges in the environment, hence in one embodiment, an AI or other analysis system analyzes pictures, video and/or models of the environment to identify or otherwise determine objects and shapes in the environment. For example, an AI may identify bounding rectangles and other features/characteristics of the appliance or cabinets so that they may be automatically selected/deselected, in for example, a display or user interface of a device used to interact with the support agent. By recognizing objects in the environment, this may facilitate response to support requests to identify issue to be supported. For example, if the appliance is broken, the support agent may ask the caller to mark segment 422 on a user interface of the caller's device, e.g., FIG. 1 mobile device 102. Segment 422 is a portion of the bottom 420 countertop edge. To determine the width of the segment 422, the homeowner may be provided a user interface allowing selecting which of several possible edges 414, 418, 422, etc. (e.g., determined by way of AI analysis and/or other detection technique) is intended. The interface may allow nudging or sliding a finger or other selection tool among potential intended edges. Selection of the segment 422 may be performed by dragging the selection tool along the segment to identify a region of interest when as here the segment is part of a larger object, e.g., the underside line of a longer countertop.

In one embodiment the homeowner may drag a finger or use some other selection tool and/or device along the segment to identify the region, e.g., the segment, to be measured. As discussed above with respect to FIG. 3, an imprecise tool such as a finger, or other selection device or tool that is used by a person to select portions of a user interface (e.g., a display showing some or all of the environment 400), may be close but not accurately on the detected lower 420 edge of the countertop and is likely not accurately at the start of the segment 422 to be measured. However, with snapping, a selection motion across a user interface may be snapped to the identified edge 420 for the segment 422 of interest. But while the selection motion may be tracked along the detected edge of the segment, it may be difficult to know accurately where to start and/or stop selection of a segment 422 of a larger edge 420.

In one embodiment, by applying a corner detector algorithm to identify anchor points, e.g., anchors 424-436, tracking selecting the segment 422 may be improved by snapping the start and stop of selection to the anchor points 426, 428 corresponding to the beginning and ends of the segment. This snapping to anchor points is helpful when it is otherwise difficult to know where on a larger edge to start tracking the selection of the segment, and similarly difficult to know where on the larger edge to stop tracking the selection of the segment. While this issue was not pronounced in measuring the width of the FIG. 3 window 304, knowing where to start and stop measuring a segment of a larger edge is a significant issue in FIG. 4. It will be appreciated the identified anchors 424-436 are simply a small representative sampling of corner values that would be identified in an analysis of the environment 400. As with FIG. 3, after identifying the segment of interest through selecting it, imprecise selections of starting and stopping points may be snapped to anchors 426, 428, and imprecise selection across the segment 422 may be snapped to track the segment.

In one embodiment, identified features, objects, lines, curves. etc. are identified from analyzing pictures and/or videos of the environment and as such do not have known position coordinates (e.g., x, y, z coordinates for their position in the environment). In this embodiment, identified items are correlated to a model of the environment so that coordinates for the identified items may be determined. With the edge 422 and anchors 426, 428 correlated to the model, dimensions (which may be real-world coordinates, unitary based, or some other measurement scale) for the segment 422 may now be examined to determine characteristics of interest, such as its length, or to perform some other analysis.

Figure 5:
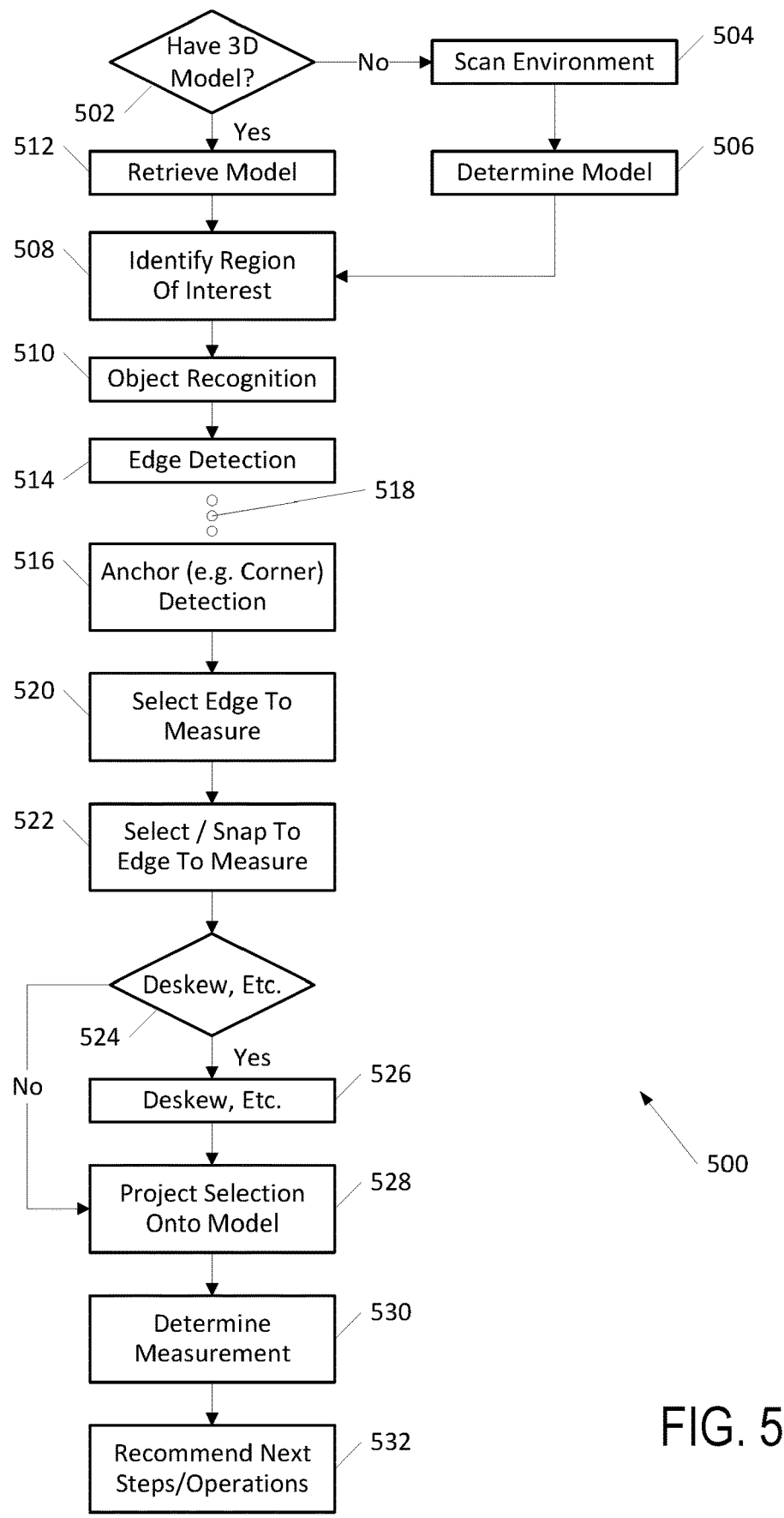
FIG. 5 illustrates a flowchart 500 according to one embodiment.

FIG. 5 illustrates a flowchart 500 according to one embodiment. Let us assume the context of a remote agent assisting a caller with a problem in an environment, such as the FIG. 3 environment 300, FIG. 4 environment 400, or some other environment. Since there could be an existing model, e.g., a 3D model mapping and/or otherwise representing an environment, a first operation may be to determine if 502 a 3D model already exists. If not, then the environment may be scanned 504, such as with a mobile device, which may be a mobile telephone, tablet (e.g., the Apple Corporation iPad Pro with LIDAR), camera, etc. It will be appreciated the field of view of the mobile device may be narrower than what is to be scanned, and thus scanning may panning or moving the mobile device, taking a panoramic photo or video, or otherwise obtaining a scan of the entire environment of interest.

In one embodiment, the scanning device may be used to determine a point cloud, e.g., through use of a LIDAR sensor, Microsoft Kinect sensor, Google Tango, or other sensing device associated with the scanning device. If a polygonal model is desired, surface reconstruction (or other technique) may be used to construct a polygonal (e.g., triangular) mesh from the point cloud. After scanning the environment, a model for the environment may be determined 506. A model of the environment, as discussed above, includes points defined in three-dimensional (3D) space that correspond to the relative positions of items, objects, or the like in the environment. It will be appreciated a particular model type, e.g., point cloud or polygonal, may be chosen for convenience. For example, a polygonal mesh may be more efficient for some graphics processing. In one embodiment, point-cloud data is obtained to represent the environment, and if needed or desired, a polygonal mesh may be derived or otherwise determined at a later time. In one embodiment, the scanning device directly determines a polygonal representation of the environment.

After determining the model, in one embodiment, a region of interest may be identified 508. As discussed above, one may assume a user of a mobile device identifies or otherwise selects a region of interest in the environment by tapping or dragging a finger, stylus, or other tool on an image of the environment displayed on a mobile device. It will be appreciated the identification 508 may help focus operation on a particular portion of the environment. For example the region of interest may be a portion of an object for which a measurement or other characteristics is desired to be determined. Object recognition 510 may be performed, either for the entire environment, or corresponding the identified region of interest. It will be appreciated if a caller is seeking support and needs to interact the displayed environment, object recognition may assist with identifying content within the environment and facilitate interacting with the environment. It will be appreciated that object recognition may be performed in real-time by the mobile device and/or by an external computing resource such as a server and/or an AI service available to the mobile device. Object recognition may also be, at least in part, time-delayed, where at least some of the object recognition is performed in real or near real-time local to the mobile device, and some processing may be sent out and which may take some time to receive an analysis.

Thus for example, in FIG. 4, object recognition may be performed and rather than, for example, identifying many different edges and anchors, instead the appliance 402, cabinets 404-410, etc. are recognized as objects (that may be placed within an AR model) and hence their various recognized edges, anchors, etc. are associated with the recognized objects. This may facilitate selecting the countertop segment 422 as the caller may be provided with selection options and if the caller identifies a problem in the appliance, all of its edges, anchors, etc. may be ignored and instead surrounding edges for the appliance enclosure, such as FIG. 4 segment 422, may be highlighted to facilitate selection of the countertop segment 422. If 502 a 3D model already exists, in the illustrated embodiment, the model may be retrieved 512, accessed or otherwise made available. It will be appreciated while the forgoing illustrated items 502-506, 512 presume creation or retrieval/accessing a model before identifying a region of interest, this ordering of operations is just one illustrative example. Subsequent operations to be discussed below, e.g., items 514-518, may instead occur before, after, or contemporaneous to operations 502-510.

As discussed above for FIG. 3 various algorithms, such as edge detection 514, and anchor (e.g., corner) detection 516 may be performed on images or video captured by a caller's device to facilitate identifying features in the environment that may assist accurately selecting portions of the environment, e.g., to assist with accurately selecting and tracking along the FIG. 4 countertop segment 422 as opposed inadvertently identifying the top of the appliance 402. The ellipses 518 represent there are other algorithms such as curve detection, feature extraction that may be applied to the image(s) and/or video(s) of the environment, and other techniques to identify edge, line, curve, object, semantics, relationships between objects in the environment, object characteristics, and the like. Output from the algorithms may be associated with one or more portion of the environment, such as with points, lines, edges, features, and/or objects in the environment. Output from any of these algorithms 514-518 may be mapped against or otherwise associated with coordinates for a model of the environment to identify, for example, position information/coordinates for items identified by the algorithms.

With a model, which may be augmented with output from various detection algorithms 514-518, a next operation may be to select an edge to perform some operation on. If we assume a situation such as a remote support of a caller, in one embodiment, assuming a model for an environment is determined, and features in the environment such as edges, corners, objects, etc., have been detected, operations may be performed in the environment. For example, if the remote support is to replace a broken appliance (e.g., the FIG. 4 appliance 402), then the caller needing support may be requested to select an edge (e.g., FIG. 4 region of interest/edge 422). With edge detection 514 the user may be able to simply select 520 the correct edge, and if, for example a user interface (UI) highlights and/or otherwise snaps 522 selection to an incorrect edge, the caller may re-select (not illustrated) another edge until the correct edge is highlighted. It will be appreciated there may be UI features/elements to allow nudging/sliding selection across the UI to enable correcting an incorrect selection which may happen when a thicker selection tool (e.g., a finger, stylus, etc.) is applied to a representation, e.g., a photo, of the environment. And as discussed above, in some embodiments, object recognition may enable quickly selecting features of or around an identified object.

It will be appreciated, depending on the environment, nature of the scanning device for the environment, the angle of incidence of a capturing device to the environment, e.g., was a scanning device held at an angle and the scan is skewed, is there a perspective in the scan such as illustrated in FIG. 4, etc., a test may be performed to determine if 524 it is desirable to deskew the 3D model and/or the selected edge before performing a measurement or other operation on the model. Depending on the operation to be performed, and when accuracy may be improved, it may be desirable to deskew 526 a selected object, edge, or the like, such as to correct its apparent angle, correct for perspective, etc. It will be appreciated that other manipulations may also be performed and deskewing is a representative example of a manipulation that may be performed and other transformations may be performed. If 524 deskewing is not desired, or after performing the deskew/other operation(s), the selected detected region of interest, e.g., the selected edge or other portion of the environment that was detected 514-518, may be projected 528 onto the model of the environment.

In one embodiment, identification of features, objects, edges, curves, corners, etc. may be determined separate from a model of the environment, e.g., a point or polygonal based 3D model or other format. That is, identification/detection of environment content may be made, for example, on a 2D representation of the environment, such as a photo or scan of the environment, on a 2D projection from 3D imaging, etc. Projection 528 back onto a model allows determining corresponding position coordinates in the 3D space of the environment. It will be appreciated terms such as projection or reverse-projection are exemplary operations for moving from a 2D depiction of the environment to a 3D space representing the environment. Any technique to move from 2D to 3D may be used. With the projection, the measurement may be determined 530, for example, based on a trigonometric comparison of the starting and ending coordinates for the selected 520 edge and computing the length of the line between them. As discussed above, measurement may be more accurate with use of anchors associated with the selected edge. It will be appreciated, measuring is just one exemplary action of many possible actions to take.

Once the measurement is determined 530, in one embodiment, a subsequent operation may be to recommend 532 next steps, perform further operations, etc. That is, for example, in the context of a remote support call, the next step may be to discuss what to do with knowing the measurement of the region of interest, e.g., to replace defective blinds, replace a broken appliance, etc. It will be appreciated the recommendation may be based at least in part on data received from one or more Artificial Intelligence (AI) Engines (or "machine intelligence") to assist with analyzing an environment, any associated model (2D, 3D, etc.) and identification of features, objects, lines, corners, etc. in the environment, as well as providing suggestions, alerts, notifications, recommendations (such as repairs and/or replacement that appear compatible with the environment), or the like.

Figure 6:
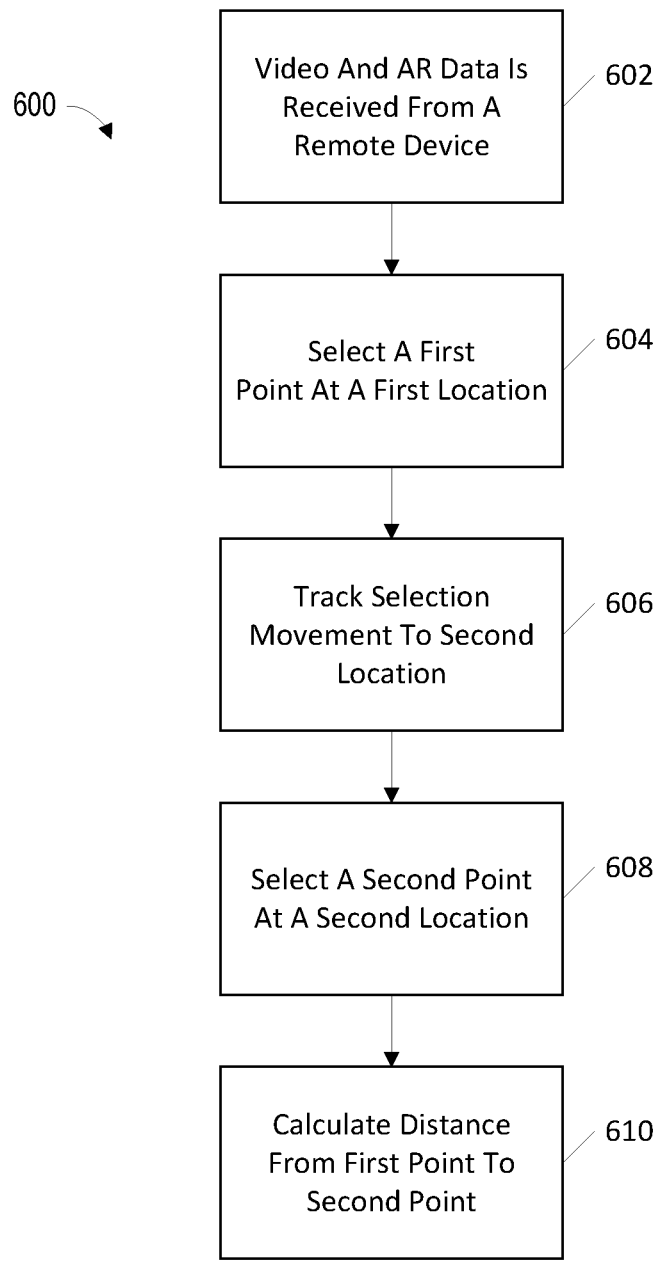
FIG. 6 depicts an example flow for fingerprinting the video frames that may be carried out in the high-level flow of FIG. 5, according to various embodiments.

FIG. 6 depicts an example method 600 for taking measurements remotely from a video stream. The operations of FIG. 5 may be executed in whole or in part, and some operations may be removed or added depending upon the needs of a given implementation. The operations of FIG. 5 may be executed by system 200, described above.

In operation 602, a video stream and associated AR data, including both point cloud data and camera pose/motion data, is received from a mobile device, such as mobile device 102, by a remote device, such as remote device 202.

The video stream may be captured by an input device, such as a camera 104 or other sensor (LIDAR etc.) of a mobile device 102 as discussed above. The video stream may have associated motion data, such as may be obtained from sensors 106. This video may, in various embodiments, be processed by the AR API of the capturing device to generate AR data. As can be seen in example system 200, in some embodiments a video stream may be received at remote device 202 following relay or partial processing by a central server, such as central server 206. In other embodiments, the video stream may be received directly from the mobile device by the remote device. A point cloud data may further be directly captured by the mobile device, such as where the mobile device is equipped with sensors for directly measuring the depth of points within the scene being captured by the mobile device, or associated with devices that may capture the point cloud for the mobile device and associate the point cloud with the video stream. Camera pose/motion data may be captured by one or more sensors equipped to the mobile device, such as gyroscopes, accelerometers, and/or other motion sensors, such as spatial position sensors 106 on mobile device 102. In some embodiments, the point cloud may be associated with or replaced with a 3D polygonal model derived from, at least in part, the point cloud.

In some embodiments, the mobile device is not equipped to directly capture the point cloud data. In one embodiment, the point cloud data may be at least partially computed from the video stream, using techniques such as photogrammetry to calculate depth data from adjacent video frames that provide slightly different views, similar to views that may be obtained from a stereoscopic camera. In another embodiment, one or more device associated with the mobile device may sense and/or otherwise capture data that may include point cloud data or contain data that may be used to determine point cloud data, polygonal data for a 3D model, and/or other data representing and/or otherwise corresponding to an environment. Such point cloud, polygonal or other data corresponding to scanning and/or representing an environment, as well as data/information/sensor readings that may be used to derive a representation of the environment, e.g., camera pose/motion data, may be generally referred to as "modeling data". In some embodiments, computation and/or processing of such modeling data may be handled by the mobile device directly, such as with an AR API that is running on the mobile device. In such implementations, modeling data is transmitted from the mobile device to the remote device.

Alternatively or additionally, some or all of the modeling data may be computed by one or more server, e.g., central server 206, operating individually and/or collectively to handle a computation task. In such embodiments, the mobile device may send a video stream along with modeling data to the server (or servers). The server may then compute the point cloud, 3D polygonal model and/or other representation of the environment from the data, the video stream and camera pose/motion data. Use of a server for calculation may be desirable in implementations the mobile device lacks (perhaps only temporarily) sufficient power to compute a point cloud on the fly, and/or where the central server could run enhanced or more computationally intense algorithms that would yield a more precise point cloud than an AR API running on the mobile device could supply. Following computation of the point cloud, the central server can then transmit the information to the remote device. In some embodiments, the central server may also pass through to the remote device the video stream and camera pose/motion data received from the mobile device along with the point cloud data.

In still other embodiments, the remote device, such as remote device 202, may handle the processing and computation of modeling data, such as point cloud data, similar to a central server. In such embodiments, the mobile device may transmit the video stream and modeling data, such as camera pose/motion data to the remote device, with the camera pose/motion data tagged to the video stream frames, where the remote device handles processing and computation of the point cloud data. Note one or more mobile device may operate to perform the operations described here for a server such as central server 206. Note that AR data does not have to be data about AR objects, rather, AR data may be data that corresponds to each frame in the video stream that may be necessary to enable the placement of AR objects within the captured scene.

In one embodiment, AR data may be captured contemporaneously with and/or extracted from, the video stream, and may be tagged to the video stream potentially on a frame-by-frame basis (discussed in greater detail below). The AR data may include camera motion/camera pose data (such as captured by spatial position sensors 106), AR feature point data, depth data directly measured by a depth sensor and/or other sensor, predicted and/or computed depth data, as discussed above, and/or disparity maps. Other embodiments may include additional data types, different data types, or fewer data types. The various types of AR data may be derived from various raw data inputs, including RGB images (such as the sequence of frames of the video stream), camera intrinsics/pose and/or camera transforms (such as from camera 104 and/or spatial position sensor 106), 3D feature points, and/or depth images, among other types of possible data. RGB images may be extracted from video stream frames.

In addition to motion data, camera intrinsics can include various known or readily determined properties of the capturing camera, such as focal length, aperture, optical center, angle of view, focal point, etc. For example, knowing the focal point of a camera can allow a rough approximation of distance (depth) to a feature when that feature is in focus. Whether a feature is in focus may be determined by techniques such as edge detection or another contrast-based technique. However, it will be appreciated, in some instances, only a range of depths may be determined, such as where the camera is focused relatively far away from the camera position, and/or the camera utilizes a small aperture (relatively high f-stop, such as f/8, f/11, etc.), so as to offer a large depth of field.

Camera transforms can include the various variables necessary to transform between the 3D objects within the field of view of the camera and the 2D image plane of the camera. Such variables can include information about the spatial location of the capturing device. 3D feature points can include feature points useable by the AR API or central server to create the AR feature point data, and may be extracted from the video stream, such as various anchor points or features, and/or captured using one or more sensors, such as spatial position sensor 106. Directly measured depth images can include imaging captured by a depth-sensitive device, such as a LIDAR sensor or infrared range finder, to allow for direct, and potentially more precise, depth measurements of various points within the scene captured by the camera. Where direct depth measurements are available, data similar to that available for the camera may be used (e.g., camera intrinsics and camera transforms) to process the depth measurements and correlate with the images from the camera.

As mentioned above, modeling data may include AR feature point data that can include data concerning or otherwise identifying various feature points in the captured scene that are identified by the AR API. These feature points may include anchor points (e.g., corners) corresponding to various identified features such as edges, points, planes, and other features detected via an object recognition algorithm (e.g., an AI as discussed above) or other suitable technique, and/or otherwise detected directly or indirectly by a sensor such as spatial position sensor 106. Depth data may include the aforementioned direct depth measurements, which may be correlated with identified AR feature point data by the AR API. Corollary to or alternative to directly measured depth data includes predicted depth data, which the AR API may derive from any number of techniques, such as AI/machine learning, or photogrammetry and comparison between proximate frames of the captured video. Similar to such comparison are disparity maps, which may include a map indicating the field of view differences between left/right frames in the case of a stereo camera, or proximate frames of the captured video. A disparity map may be useful for computing points in the point cloud, including obtaining predicted depth data. It should be understood that proximate frames need not be temporally adjacent in the video stream, but rather proximate in terms of field of view: two frames need only simply share at least an overlapping portion of a given scene to be considered proximate for purposes of a disparity map.

In operation 604, a first point, such as anchor point 330 (FIG. 3), is selected from the video stream at a first location, such at the beginning of identified edge 316. This first point may be directly selected by a user of the mobile device, such as by touching or otherwise indicating on the mobile device a particular point in the video stream displayed on the mobile device, and the precise selection may be auto-selected to snap to the identified anchor point/corner for the edge 316. The first point may alternatively be selected using a stylus, mouse, keyboard, or any other suitable method for selecting a point within a displayed view on, for example, a mobile device. Selecting this point, in embodiments, causes the mobile device to register a specific x, y coordinate on the mobile device display. This selected point may be registered by the mobile device and correlated to a particular x, y location within the video stream. By mapping the selection to corresponding point cloud data, or 3D polygonal mesh data, the depth information can be tagged to the selected point as the z coordinate (depth data) or location. The location of the selected point may then be transmitted to either the central server (if present/utilized) and/or the remote device. Depending on whether the mobile device or a central server handles processing and determining of modeling data, such as depth cloud data, 3D model polygonal data, tagging or correlation may be performed by either the mobile device or passed through and performed by the central server.

As mentioned above, the mobile device may be engaged in a two-way communications session with the remote device, such as in a remote support call where a user of the remote device may be able to provide direction to a user of the mobile device, e.g. directing to point the camera at a particular object or feature, hold the camera in some fashion, etc. In some embodiments, the user of the remote device may be able to select the first point at the remote device. In such embodiments, selecting the first point on the remote device causes the x, y coordinate to be registered with respect to a display on the remote device, and then correlated to the point cloud data to determine the corresponding z coordinate/depth data. While FIGS. 4 and 5 illustrated identified features in an environment after identifying an edge and/or selecting across the edge to mark a region of interest, it will be appreciated projection of identified features/selections may be an ongoing/recurring task. Selection of the first point, as mentioned above with respect to FIG. 3, may result in the location of the first point being superimposed on the video stream as an AR object, tagged to the object as it appears on both the mobile device and remote device displays. The object may appear as a dot, point, target, or another suitable graphic indicator, and may appear on either or both of the displays of the mobile device and/or remote device. As an AR object, the object of the first point will move throughout the frame of the video stream as if placed upon the tagged object or feature that is being measured.

Next, in operation 606, the user of the mobile device may, as discussed above, drag or otherwise select along the edge 316 and stop selection at, for example, anchor point 332 to select, in operation 608, a second point at another location. Note the second point should be on the same objected detected in the environment, e.g., the edge 316, corresponding to the first point, but the selection may end located on any other arbitrary object or feature, e.g. measuring the dimensions of a room, the length of a counter, the distance between two objects, etc. Within a determinable margin of error, selection near, for example, edge 316 will be snapped to the edge to facilitate a precise selection of the edge from the first and second anchor points for the edge. However, if the selection is sufficiently far off the edge, the user interface may present a user with options, such as to start over to reselect a region of interest, to create a virtual line between the starting point and the current point (which may be snapped to a corner, edge, feature, etc. of an object identified in the environment), or take other action.

In some embodiments, even though the mobile device may be capable of capturing the entire measured object or locations of the first and second points in a single field of view, it nevertheless may be desirable to bring the mobile device relatively close to the locations of the first and second points individually. Depending on how the modeling data is generated, decreasing the distance between the mobile device and a given point may allow for determining and/or measuring a more accurate model, such as a more densely packed point cloud or more refined 3D polygonal mesh. The more accurate a model, in turn, facilitates a greater accuracy in any measurements computed between two or more points. As the camera/mobile device is moved and if/when the first point leaves the field of view of the mobile device, additional AR feature points may be obtained as other parts of the environment come into view. Previously obtained feature points are retained in storage (either on the mobile device, remote device, central server, or a combination of any of the devices) while additional points are added to the point cloud for newly viewed parts of the environment. Simultaneous localization and mapping (SLAM), or another suitable technique, may be used to relate and integrate new points into the existing point cloud, so that the environment around the mobile device is progressively augmented with additional data, such as depth points, as more of the environment passes through the view of the mobile device. In this way, the location of placed points (and/or other AR objects) within the mobile device's environment are remembered even when not in view of the mobile device, and reappear when their location comes back into view of the mobile device.

As will be understood, SLAM may include data such as the camera pose to determine the x, y and potentially, the z coordinates of the additional depth points that are added to the point cloud, with the camera pose and motion data being used to determine the coordinates of the additional points in relation to the previously established points. All points may be expressed with respect to a fixed anchor point within the environment, with the camera's position also being determined with respect to the anchor point. In other embodiments, the coordinates of the points in the point cloud may be expressed relative to the current position of the mobile device. In such an embodiment, the x, y, z coordinates of each point are continually changing and need to be continually or periodically recomputed as the camera pose changes.

In operation 610, once the first and second (anchor) points are identified, the distance between the two points is calculated with reference to the x, y, z coordinates determined for each of the first and second points. Identifying the coordinates may require, as discussed above, deskewing identified objects/lines/edges/etc. in an environment, and mapping identified objects/lines/edges/etc. to the point cloud, 3D polygonal mesh, or other 3D representation of the environment. The distance may be computed using known trigonometric functions. The distance may be displayed to the mobile device, the remote device, or both. In some embodiments, the distance may be overlaid upon the line extending between the first and second points, similar to a tape measure. In other embodiments, the distance may be displayed statically on either of both of the mobile device and remote device. The mobile device, remote device, or central server may handle the distance calculations.

While method 600 describes two points used to compute a distance, it should be understood that operations 606 and 608 may be repeated to add additional points, e.g. third point, fourth point, fifth point, etc., with operation 610 calculating multiple distances, areas and/or volumes depending upon the number of points selected and the measurements desired by the user(s). Also as discussed above, while the example presented here concerns measuring the length of an edge identified in an environment, the selection could be for an object (such as the FIG. 4 appliance) where the size of the opening in which an appliance is disposed may be measured and facilitate, for example, a user of a remote device to assist repairing and/or replacing the appliance if and as needed.

In one embodiment, various operations of method 600 rely upon the modeling data, such as AR data, to be time synchronized with the associated frames of the video stream. Synchronizing frames of a video stream captured by a capture device, such as mobile device 102, may include individual sequential frames of the video stream captured by a video camera, such as camera 104 on mobile device 102. Frames may be fingerprinted so that it may be synced with a portion of modeling data, such as AR data, that was captured substantially contemporaneously with a frame. The end result is that each frame from the captured video becomes a fingerprinted frame, thus providing a fingerprinted video that is synced with the modeling data on a frame by frame basis. The collection of fingerprinted frames may be played back similar to the original video stream, but in synchronization with the modeling data. A fingerprinted video is thus correlated with modeling data, and, for example with respect to AR data, results in AR feature points being available that are synchronized with each video frame, similar to how originally generated by an AR API executed on a capturing device.

FIG. 7 illustrates an example computer device 700 that may be employed by the apparatuses and/or methods described herein, in accordance with various embodiments. As shown, computer device 700 may include a number of components, such as one or more processor(s) 704 (one shown) and at least one communication chip 706. In various embodiments, the one or more processor(s) 704 each may include one or more processor cores. In various embodiments, the one or more processor(s) 704 may include hardware accelerators to complement the one or more processor cores. In various embodiments, the at least one communication chip 706 may be physically and electrically coupled to the one or more processor(s) 704. In further implementations, the communication chip 706 may be part of the one or more processor(s) 704. In various embodiments, computer device 700 may include printed circuit board (PCB) 702. For these embodiments, the one or more processor(s) 704 and communication chip 706 may be disposed thereon. In alternate embodiments, the various components may be coupled without the employment of PCB 702.

Depending on its applications, computer device 700 may include other components that may be physically and electrically coupled to the PCB 702. These other components may include, but are not limited to, memory controller 726, volatile memory (e.g., dynamic random access memory (DRAM) 720), non-volatile memory such as read only memory (ROM) 724, flash memory 722, storage device 754 (e.g., a hard-disk drive (HDD)), an I/O controller 741, a digital signal processor (not shown), a crypto processor (not shown), a graphics processor 730, one or more antennae 728, a display, a touch screen display 732, a touch screen controller 746, a battery 736, an audio codec (not shown), a video codec (not shown), a global positioning system (GPS) device 740, a compass 742, an accelerometer (not shown), a gyroscope (not shown), a speaker 750, a camera 752, and a mass storage device (such as hard disk drive, a solid state drive, compact disk (CD), digital versatile disk (DVD)) (not shown), and so forth.

In some embodiments, the one or more processor(s) 704, flash memory 722, and/or storage device 754 may include associated firmware (not shown) storing programming instructions configured to enable computer device 700, in response to execution of the programming instructions by one or more processor(s) 704, to practice all or selected aspects of the system 100, system 200, flowchart 500, and/or method 600 described herein. In various embodiments, these aspects may additionally or alternatively be implemented using hardware separate from the one or more processor(s) 704, flash memory 722, or storage device 754.

The communication chips 706 may enable wired and/or wireless communication to transfer of data to and from the computer device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 700 may include a plurality of communication chips 706. For instance, a first communication chip 706 may be dedicated to shorter range wireless communications such as Wi-Fi and Bluetooth, and a second communication chip 706 may be dedicated to longer range wireless communications such as GPS, EDGE, GPRS, CDMA, WiMAX, LTE, Ev-DO, and others.

In various implementations, the computer device 700 may be a laptop, a netbook, a notebook, an ultrabook, a smartphone, a computer tablet, a personal digital assistant (PDA), a desktop computer, smart glasses, or a server. In further implementations, the computer device 700 may be any other electronic device that processes data, and the device may be stand alone or incorporated into another machine, including transportation devices such as cars, motorcycles, planes, trains, etc.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 8:
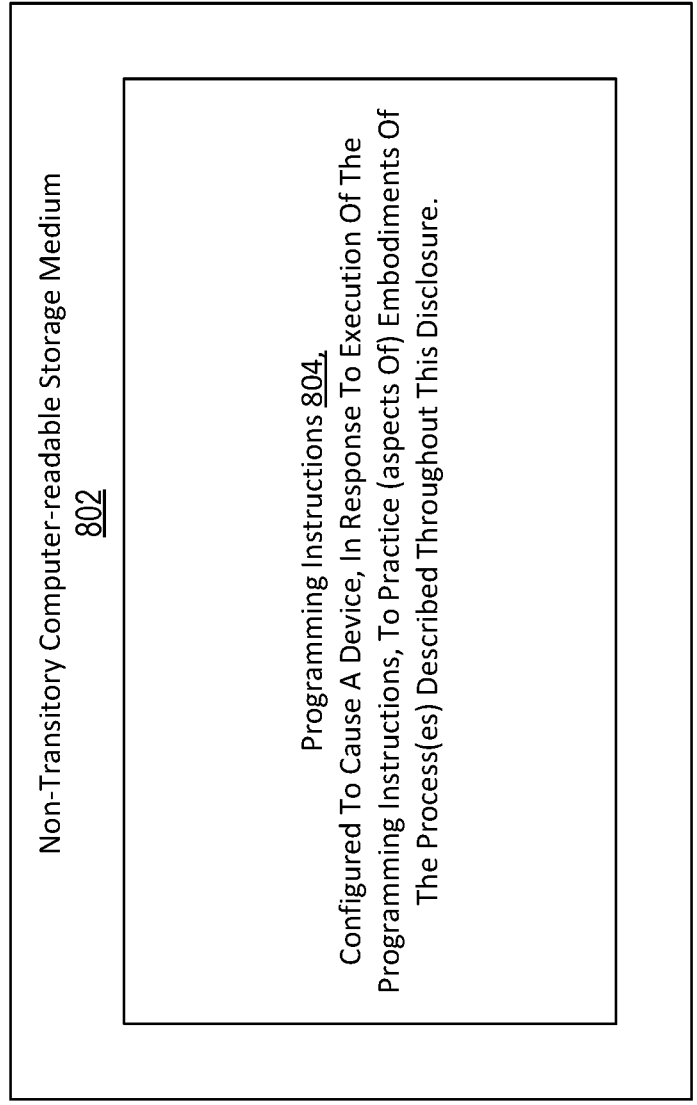
FIG. 8 is a block diagram of a computer-readable storage medium that can be used to implement some of the components of the system or methods disclosed herein, according to various embodiments.

FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., portable device 102, or computer 700, in response to execution of the programming instructions, to implement (aspects of) system 100, system 200, flowchart 500, and/or method 800. In alternate embodiments, programming instructions 804 may be disposed on multiple computer-readable non-transitory storage media 802 instead. In still other embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for measuring a region of interest in a video stream of an environment, the environment having an associated model including coordinates for locations within the model of the environment, comprising:
   receiving, from a device, the video stream of the environment;
   identifying, using object recognition within the video stream, an object;
   associating one or more edges and anchor points with the identified object;
   receiving, from the device, a user selection of a region of interest in the environment, the region of interest including the identified object;
   receiving, from the device, a user selection of the identified object;
   snapping a starting point to a first anchor point proximate to the starting point, the first anchor point one of the anchor points of the identified object;
   monitoring a selection proximate to the region of interest;
   identifying a stopping point for the selection along the region of interest;
   determining whether the stopping point is on the identified object, and if not, presenting an interface with options for confirming the stopping point;
   snapping the stopping point to a second anchor point proximate to the stopping point;
   correlating the first and second anchor points with coordinates in the model; and
   calculating a distance between the first and second anchor point based at least in part on coordinates for the first anchor point relative to coordinates for the second anchor point.

2. The method of claim 1, the correlating comprising projecting the first and second anchor points onto the model to respectively determine 3D coordinates in the model for anchor points.

3. The method of claim 2, further comprising deskewing the region of interest prior to the correlating.

4. The method of claim 1, wherein modeling data is associated with the video stream and comprises augmented reality (AR) data correlated to the video stream.

5. The method of claim 1, further comprising:
   determining the selection along the region of interest is proximate to a third anchor point; and
   revising the region of interest based at least in part on the first and third anchor points.

6. The method of claim 1, further comprising determining a measurement of an enclosure for the identified object.

7. The method of claim 6, further comprising:
   highlighting the identified object within the model; and
   presenting a prompt to display on the device to confirm the identified object for the measurement of the enclosure.

8. A method for a receiving device in communication over a network with a sending device to measure an object in a video stream sent by the sending device, the video stream displaying an environment having an associated model including a coordinate system to place objects within the model, comprising:
   receiving, by the receiving device, the video stream from the sending device;
   identifying objects in the environment to the sending device;
   associating one or more edges and anchor points with each of the identified objects;
   monitoring a dragging across a selected one of the identified objects, including snapping a starting point for the dragging to a first anchor point proximate to the starting point, the first anchor point associated with the selected identified object;
   determining whether a stopping point is on the selected identified object, and if not, presenting an interface with options for confirming the stopping point;
   snapping the stopping point to a second anchor point proximate to the stopping point;
   correlating the first and second anchor points with the coordinate system; and
   calculating a measurement of the selected one of the identified objects based at least in part on the first and second anchor points.

9. The method of claim 8, further comprising:
   receiving modeling data corresponding to the video stream; and
   computing the model based at least in part on the modeling data.

10. The method of claim 8, further comprising an Artificial Intelligence analyzing a selected one or more of the video stream or the model to perform the identifying objects.

11. The method of claim 8, further comprising sending a recommended next action from the receiving device to at least the sending device.

12. The method of claim 11, further comprising:
   determining a replacement is needed for the selected one of the identified objects; and
   locating the replacement.

13. A non-transitory computer readable medium (CRM) comprising instructions for measuring a region of interest in a video stream of an environment, the environment having an associated model including coordinates for locations within the model of the environment, the instructions, when executed by an apparatus, cause the apparatus to perform:
   receiving the video stream of the environment;
   identifying, using object recognition within the video stream, an object;
   associating one or more edges and anchor points with the identified object;
   receiving a user selection of a region of interest in the environment, the region of interest including the identified object;
   receiving a user selection of the identified object;
   snapping a starting point to a first anchor point proximate to the starting point, the first anchor point one of the anchor points of the identified object;
   monitoring a selection proximate to the region of interest;
   identifying a stopping point for the selection along the region of interest;

determining whether the stopping point is on the identified object, and if not, presenting an interface with options for confirming the stopping point;

snapping the stopping point to a second anchor point proximate to the stopping point;

correlating the first and second anchor points with coordinates in the model; and calculating a distance between the first and second anchor point based at least in part on coordinates for the first anchor point relative to coordinates for the second anchor point.

14. The CRM of claim 13, wherein the instructions for correlating comprise further instructions that are to further cause the apparatus to perform: projecting the first and second anchor points onto the model to respectively determine 3D coordinates in the model for anchor points.

15. The CRM of claim 14, wherein the instructions include instructions that are to further cause the apparatus to perform: deskewing the region of interest prior to the correlating.

16. The CRM of claim 13, wherein the instructions include instructions that are to further cause the apparatus to perform:

determining the selection along the region of interest is proximate to a third anchor point; and revising the region of interest based at least in part on the first and third anchor points.

17. The CRM of claim 13, wherein the instructions include instructions that are to further cause the apparatus to perform determining a measurement of an enclosure for the identified object.

18. The CRM of claim 17, wherein the instructions include instructions that are to further cause the apparatus to perform:

highlighting the identified object within the model; and presenting a prompt to display on the device to confirm the object for the measurement of the enclosure.

19. A non-transitory computer readable medium (CRM) comprising instructions for a receiving device in communication over a network with a sending device to measure an object in a video stream sent by the sending device, the video stream displaying an environment having an associated model including a coordinate system to place objects within the model, the instructions, when executed by an apparatus, cause the apparatus to perform:

receiving, by the receiving device, the video stream from the sending device;

providing a selected one or more of the video stream or the model to an artificial intelligence (AI);

receiving an analysis from the AI recognizing objects in the environment;

associating one or more edges and anchor points with each of the recognized objects;

sending an identification of the recognized objects to the sending device;

monitoring a dragging across a selected one of the recognized objects, including snapping a starting point for the dragging to a first anchor point proximate to the starting point, the first anchor point associated with the selected identified object;

determining whether a stopping point is on the selected identified object, and if not, presenting an interface with options for confirming the stopping point;

snapping the stopping point to a second anchor point proximate to the stopping point;

correlating the first and second anchor points with the coordinate system; and calculating a measurement of the selected one of the identified objects based at least in part on the first and second anchor points.

20. The CRM of claim 19, wherein the instructions include instructions that are to further cause the apparatus to perform:

receiving modeling data corresponding to the video stream; and computing the model based at least in part on the modeling data.

* * * * *